(12) United States Patent
Ozaki et al.

(10) Patent No.: US 7,088,658 B2
(45) Date of Patent: Aug. 8, 2006

(54) METHOD OF FORMATTING A DISK RECORDING MEDIUM AND INFORMATION RECORDING APPARATUS

(75) Inventors: Koji Ozaki, Kato (JP); Kazuyuki Mikawa, Kato (JP)

(73) Assignee: Fujitsu Limited, Kawasaki (JP)

( * ) Notice: Subject to any disclaimer, the term of this patent is extended or adjusted under 35 U.S.C. 154(b) by 62 days.

(21) Appl. No.: 10/819,486

(22) Filed: Apr. 7, 2004

(65) Prior Publication Data

US 2004/0190412 A1 Sep. 30, 2004

Related U.S. Application Data

(62) Division of application No. 10/428,552, filed on May 2, 2003, now Pat. No. 6,744,714, which is a division of application No. 09/703,848, filed on Nov. 1, 2000, now Pat. No. 6,587,418.

(30) Foreign Application Priority Data

| Apr. 25, 2000 | (JP) | ............................. 2000-123584 |
| Aug. 10, 2000 | (JP) | ............................. 2000-242216 |

(51) Int. Cl.
*G11B 7/00* (2006.01)
(52) U.S. Cl. .................. 369/53.15; 369/59.25
(58) Field of Classification Search ............. 369/44.32, 369/44.26, 53.14, 59.25, 53.15, 53.17
See application file for complete search history.

(56) References Cited

U.S. PATENT DOCUMENTS

| 5,166,935 A | * | 11/1992 | Bish ............................. 714/723 |
| 6,845,473 B1 | * | 1/2005 | Ko et al. ....................... 714/42 |
| 6,912,672 B1 | | 6/2005 | Ko et al. | |

FOREIGN PATENT DOCUMENTS

| JP | 62-52762 | 3/1987 |
| JP | 1-319177 | 12/1989 |
| JP | 5-2837 | 1/1993 |
| JP | 6-295538 | 10/1994 |
| JP | 8-102135 | 4/1996 |

* cited by examiner

*Primary Examiner*—Nabil Hindi
(74) *Attorney, Agent, or Firm*—Greer, Burns & Crain, Ltd.

(57) ABSTRACT

An apparatus (22) for recording and reproducing digital information uses a disk recording medium (23) in which data recording area is divided into plural zones in the radial direction, and defect information is managed for each zone. The apparatus comprises a formatting portion (26) for executing the formatting process of the disk recording medium (23), a detecting portion (24) for obtaining defect information that were detected in the last formatting process of the disk recording medium (23), and a controlling portion (25) for informing the formatting portion (26) of a zone to be formatted next in the decreasing order of the number of defects in accordance with the defect information obtained by the detecting portion (24).

6 Claims, 24 Drawing Sheets

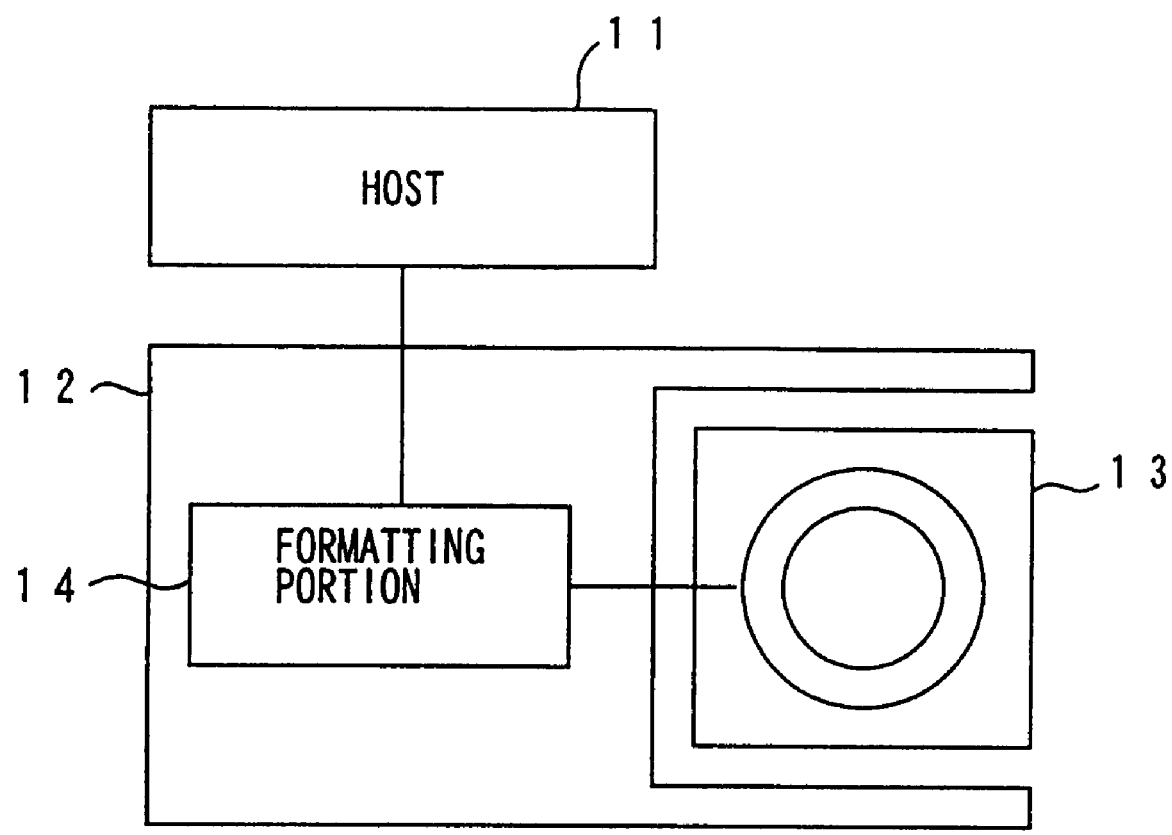

Fig. 2

| ZONE No. | ORDER OF FORMAT (①~⑱) |
|---|---|
| 0 | ①Erase/Write/Verify |
| 1 | ②Erase/Write/Verify |
| 2 | ③Erase/Write/Verify |
| 3 | ④Erase/Write/Verify |
| 4 | ⑤Erase/Write/Verify |
| 5 | ⑥Erase/Write/Verify |
| 6 | ⑦Erase/Write/Verify |
| 7 | ⑧Erase/Write/Verify |
| 8 | ⑨Erase/Write/Verify |
| 9 | ⑩Erase/Write/Verify |
| 10 | ⑪Erase/Write/Verify |
| 11 | ⑫Erase/Write/Verify |
| 12 | ⑬Erase/Write/Verify |
| 13 | ⑭Erase/Write/Verify |
| 14 | ⑮Erase/Write/Verify |
| 15 | ⑯Erase/Write/Verify |
| 16 | ⑰Erase/Write/Verify |
| 17 | ⑱Erase/Write/Verify |

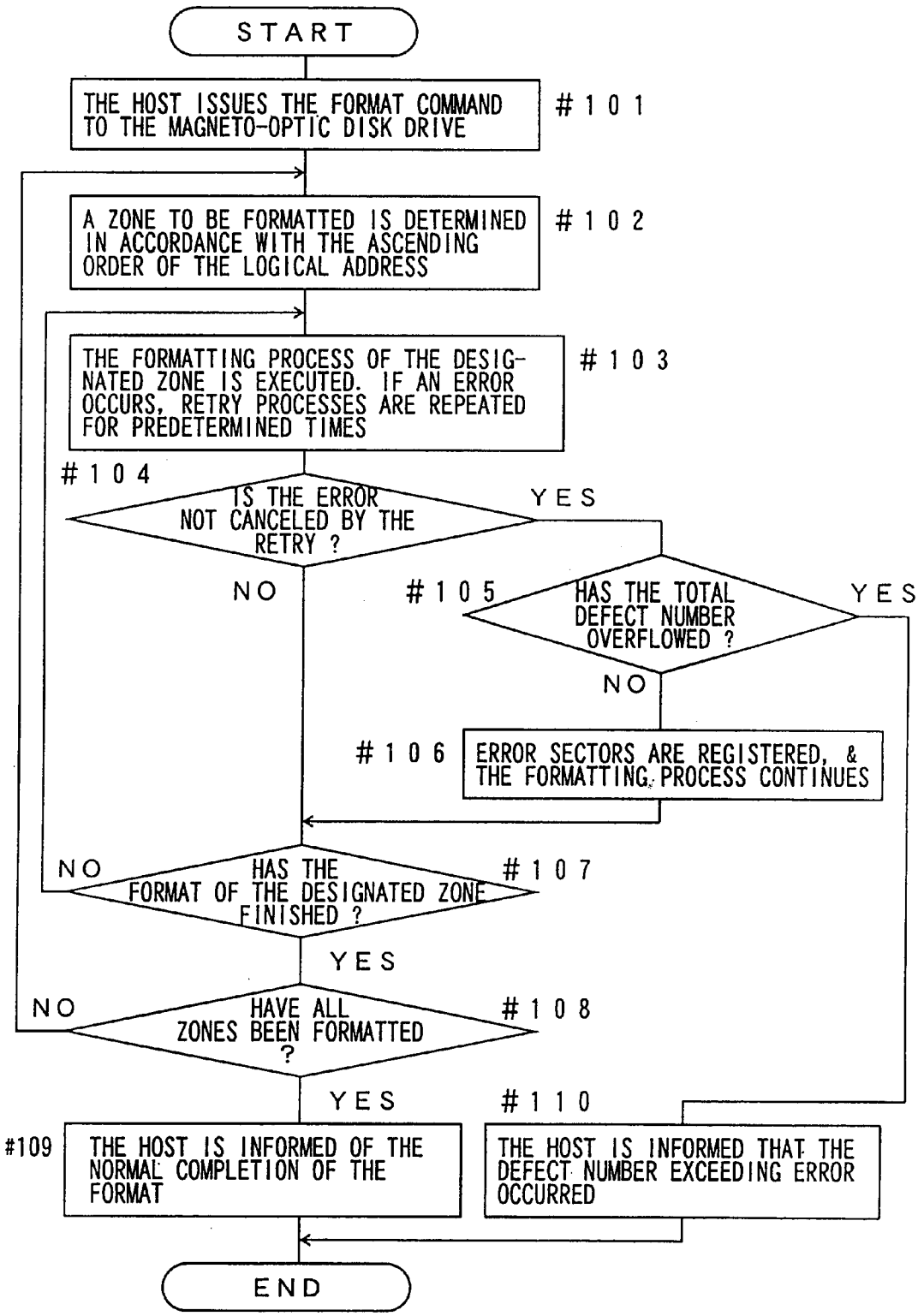

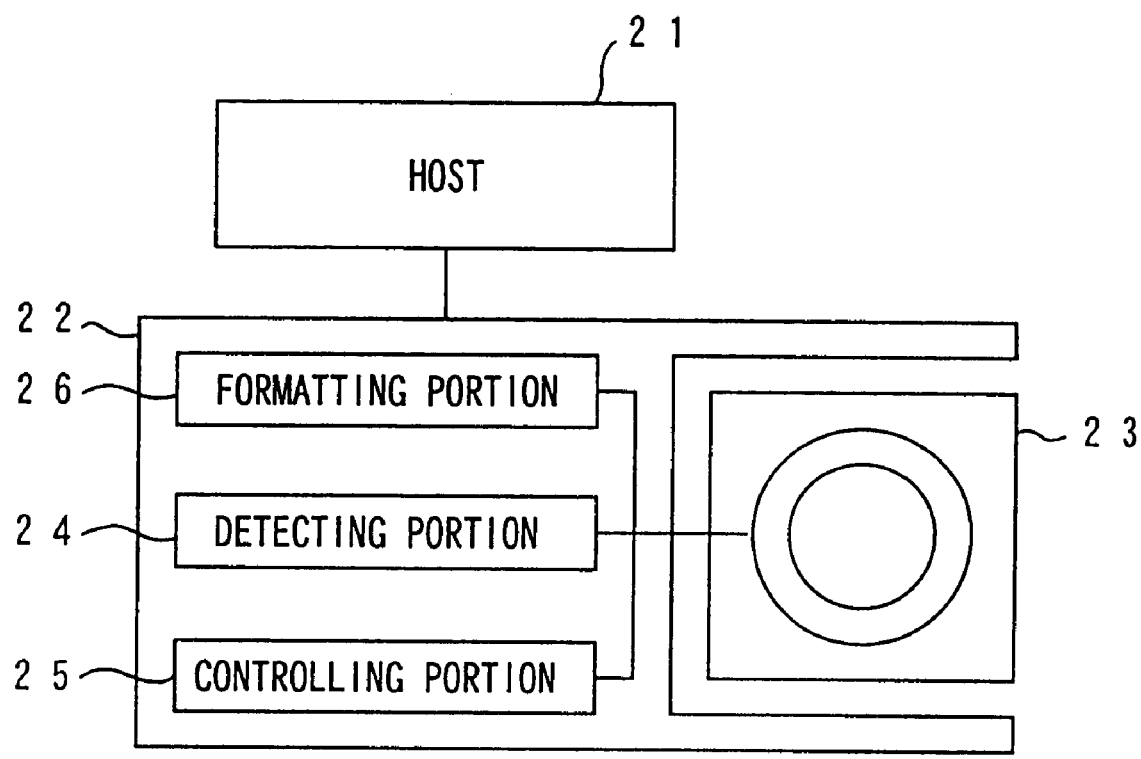

Fig. 5

| ZONE No. | ORDER OF FORMAT (①~⑱) | THE NUMBER OF DEFECTS IN THE LAST FORMAT |
|---|---|---|
| 0 | ⑥Erase/Write/Verify | 0 |
| 1 | ⑦Erase/Write/Verify | 0 |
| 2 | ③Erase/Write/Verify | 400 |
| 3 | ⑧Erase/Write/Verify | 0 |
| 4 | ⑨Erase/Write/Verify | 0 |
| 5 | ⑤Erase/Write/Verify | 100 |
| 6 | ⑩Erase/Write/Verify | 0 |
| 7 | ⑪Erase/Write/Verify | 0 |
| 8 | ④Erase/Write/Verify | 300 |
| 9 | ⑫Erase/Write/Verify | 0 |
| 10 | ⑬Erase/Write/Verify | 0 |
| 11 | ②Erase/Write/Verify | 500 |
| 12 | ⑭Erase/Write/Verify | 0 |
| 13 | ⑮Erase/Write/Verify | 0 |
| 14 | ⑯Erase/Write/Verify | 0 |
| 15 | ①Erase/Write/Verify | 600 |
| 16 | ⑰Erase/Write/Verify | 0 |
| 17 | ⑱Erase/Write/Verify | 0 |

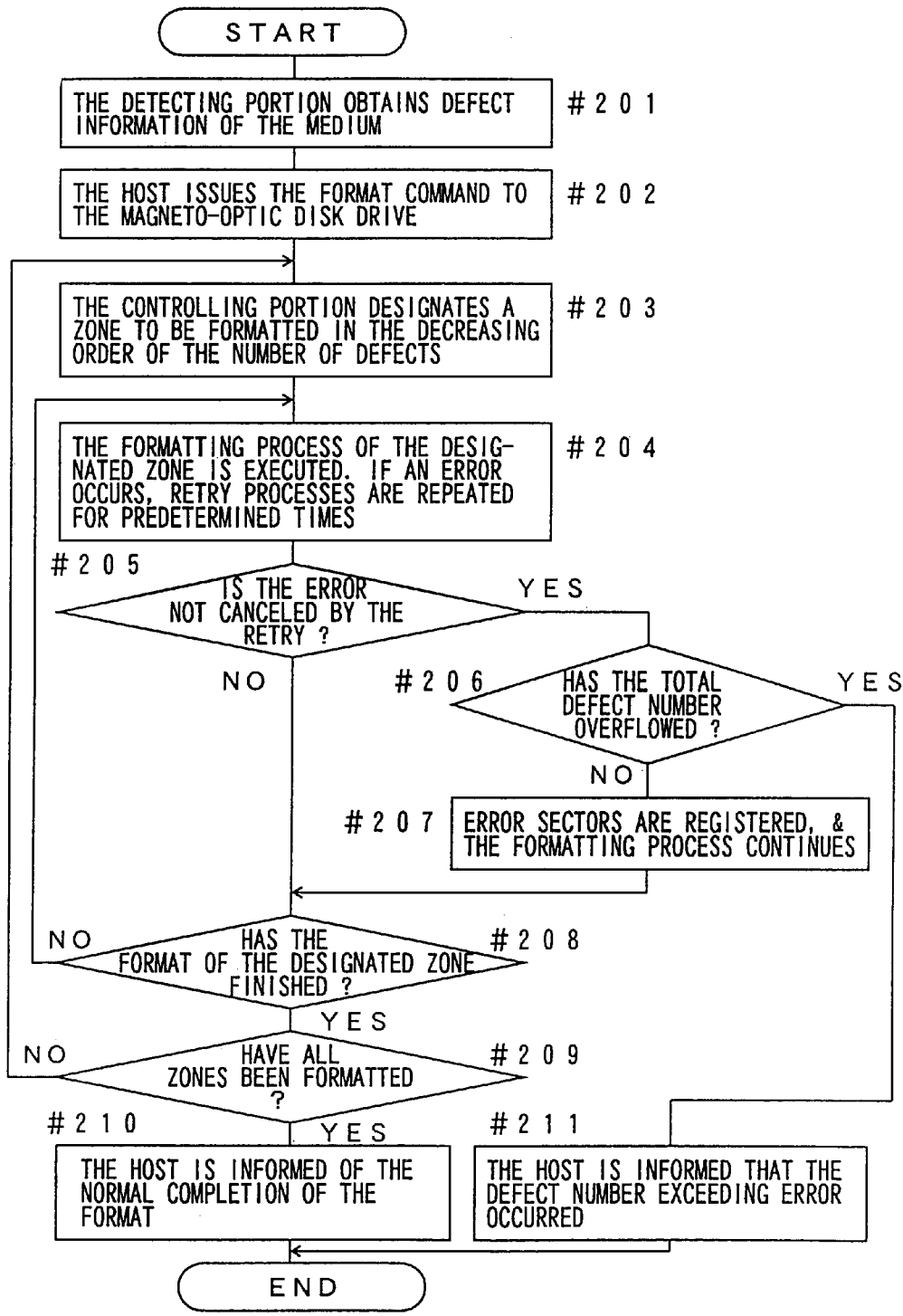

Fig. 7

| ZONE No. | ORDER OF FORMAT (①~⑱) | THE DECREASING ORDER OF THE NUMBER OF POTENTIAL DEFECTS |
|---|---|---|
| 0 | →⑥Erase/Write/Verify | ⑥ |
| 1 | →⑦Erase/Write/Verify | ⑦ |
| 2 | ③Erase/Write/Verify | ③ |
| 3 | →⑧Erase/Write/Verify | ⑧ |
| 4 | →⑨Erase/Write/Verify | ⑨ |
| 5 | ⑤Erase/Write/Verify | ⑤ |
| 6 | →⑩Erase/Write/Verify | ⑩ |
| 7 | →⑪Erase/Write/Verify | ⑪ |
| 8 | ④Erase/Write/Verify | ④ |
| 9 | →⑫Erase/Write/Verify | ⑫ |
| 10 | →⑬Erase/Write/Verify | ⑬ |
| 11 | ②Erase/Write/Verify | ② |
| 12 | →⑭Erase/Write/Verify | ⑭ |
| 13 | →⑮Erase/Write/Verify | ⑮ |
| 14 | →⑯Erase/Write/Verify | ⑯ |
| 15 | ①Erase/Write/Verify | ① |
| 16 | →⑰Erase/Write/Verify | ⑰ |
| 17 | →⑱Erase/Write/Verify | ⑱ |

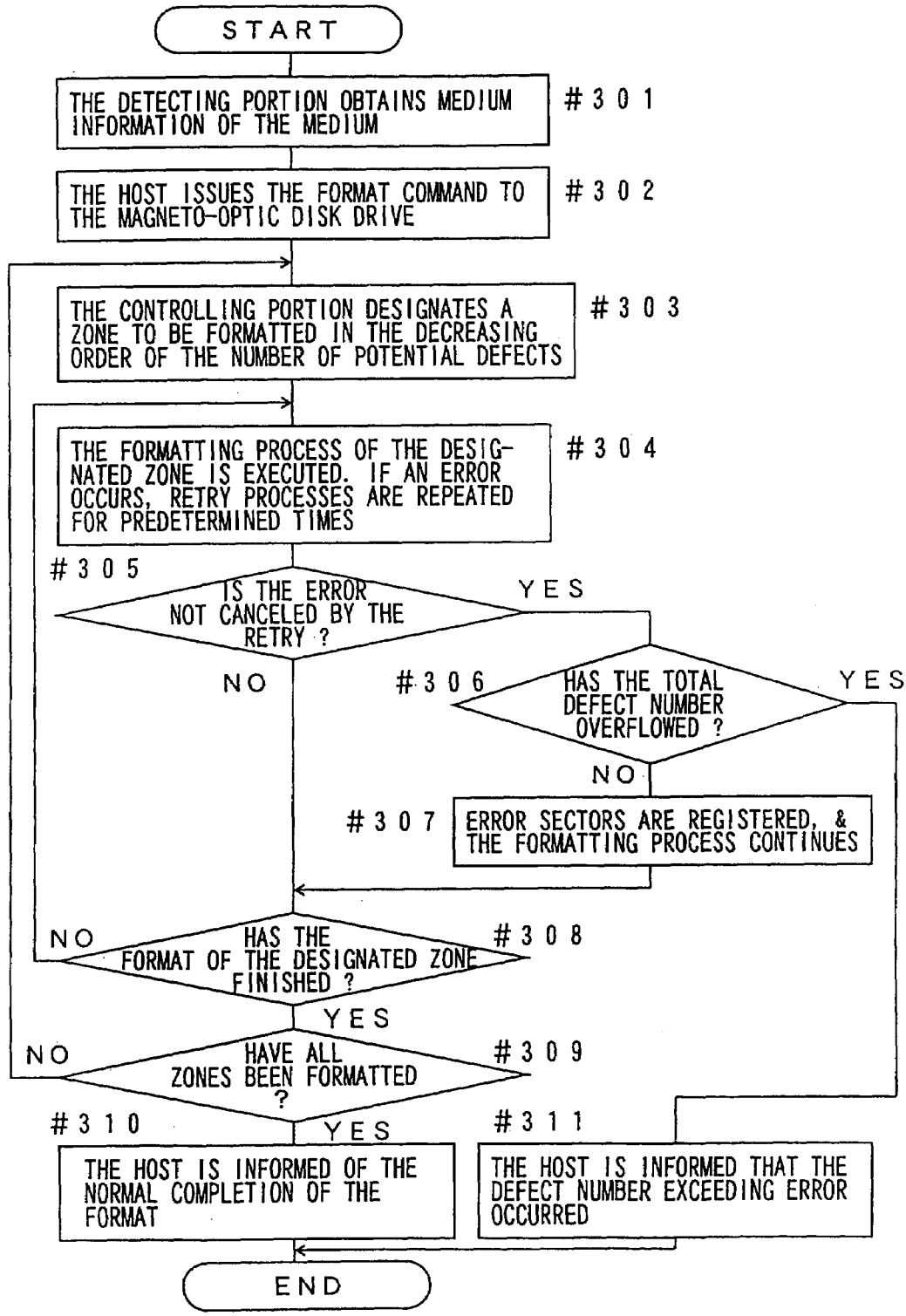

Fig. 9

| ZONE No. | ORDER OF FORMAT (①〜⑱) | THE NUMBER OF DEFECTS |
|---|---|---|
| 0 | ①Erase/Write/Verify | 0 |
| 1 | ↓ | 0 |
| 2 | ↓ | 0 |
| 3 | ②Erase/Write/Verify | 0 |
| 4 | ↓ | 0 |
| 5 | ↓ | 0 |
| 6 | ③Erase/Write/Verify | 0 |
| 7 | ↓ | 0 |
| 8 | ↓ | 0 |
| 9 | ④Erase/Write/Verify | 0 |
| 10 | ↓ | 0 |
| 11 | ↓ | 0 |
| 12 | ⑤Erase/Write/Verify | 0 |
| 13 | ↓ ⑧→↓ | 100 |
| 14 | ↓ ⑦ ↓ | 500 |
| 15 | ※⑥Erase/Write/Verify | 1000 |
| 16 | ⑨ | 2000 |
| 17 | ⑩★THE DEFECT NUMBER EXCEEDING ERROR OCCURS | 838 |

| | Bit 7 | 6 | 5 | 4 | 3 | 2 | 1 | Bit 0 |
|---|---|---|---|---|---|---|---|---|
| PRESENCE OF DEFECT SECTOR INFORMATION | | | | | | | | 1: YES 2: NO |
| DMA INSPECTION RESULT | | | | | DMA#4 1:NORMAL 0:DEFECT | DMA#3 1:NORMAL 0:DEFECT | DMA#2 1:NORMAL 0:DEFECT | DMA#1 1:NORMAL 0:DEFECT |

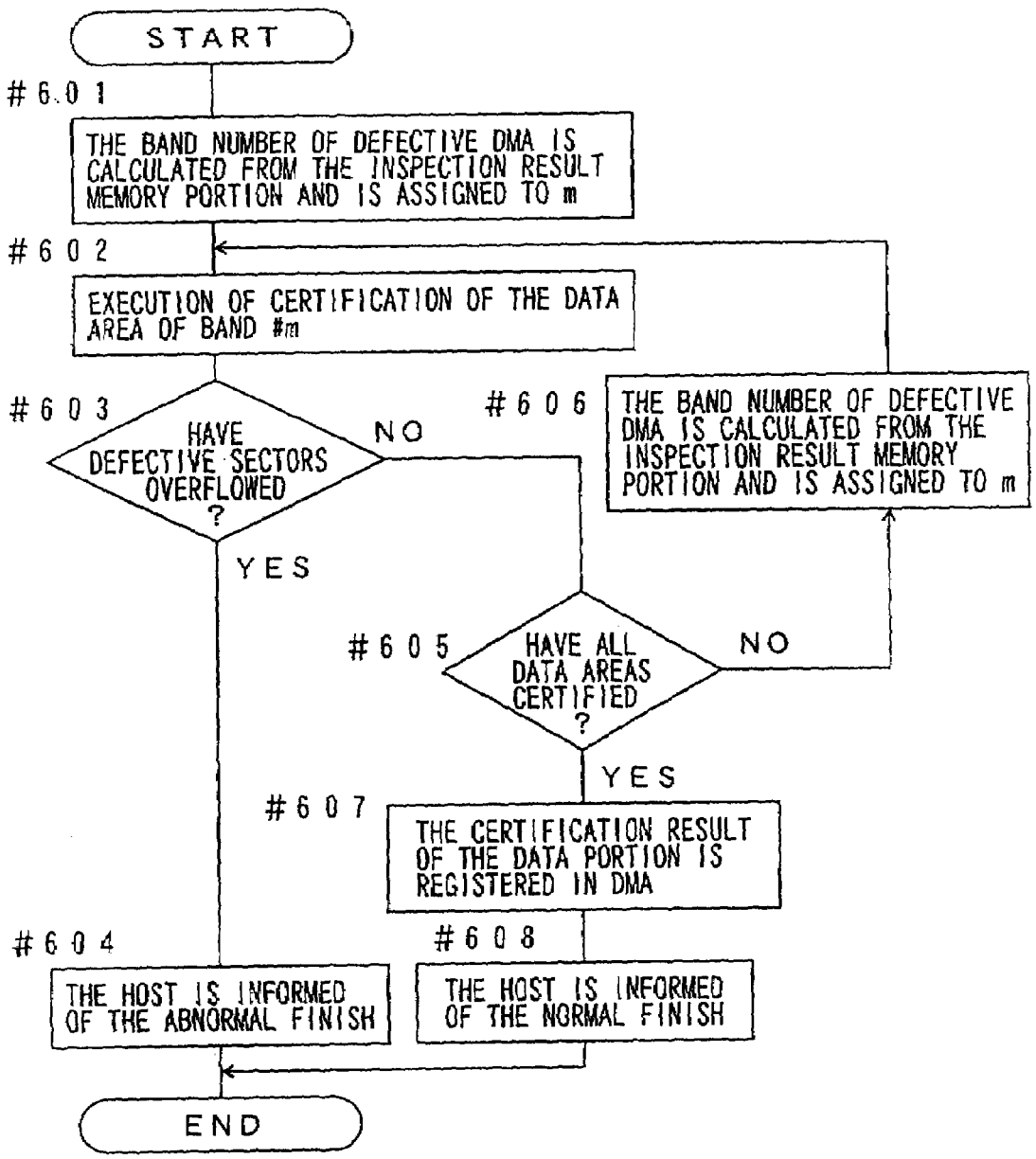

Fig. 16

|  | DMA#1 | DMA#2 | DMA#3 | DMA#4 | ORDER OF CERTIFY |
|---|---|---|---|---|---|
| CASE A | × | × | × | × | ※ERROR FINISH<br>①ANY ORDER OF BANDS |
| CASE B | ○ | × | × | × | ①Band#22<br>②Band#1<br>③ANY ORDER OF BANDS |
| CASE C | × | ○ | × | × | SAME ORDER AS ABOVE |
| CASE D | × | × | ○ | × | ①Band#1<br>②Band#22<br>③ANY ORDER OF BANDS |
| CASE E | × | × | × | ○ | SAME ORDER AS ABOVE |
| CASE F | ○ | ○ | × | × | ①Band#22<br>②ANY ORDER OF BANDS |
| CASE G | ○ | × | ○ | × | ①Band#22 or #1<br>②Band#1 or #22<br>③ANY ORDER OF BANDS |
| CASE H | ○ | × | × | ○ | SAME ORDER AS ABOVE |
| CASE I | × | ○ | ○ | × | SAME ORDER AS ABOVE |
| CASE J | × | ○ | × | ○ | SAME ORDER AS ABOVE |
| CASE K | × | × | ○ | ○ | ①Band#1<br>②ANY ORDER OF BANDS |
| CASE L | ○ | ○ | ○ | × | ①Band#22<br>②ANY ORDER OF BANDS |
| CASE M | ○ | × | ○ | ○ | ①Band#1<br>②ANY ORDER OF BANDS |
| CASE N | ○ | ○ | × | ○ | ①Band#22<br>②ANY ORDER OF BANDS |
| CASE O | × | ○ | ○ | ○ | ①Band#1<br>②ANY ORDER OF BANDS |
| CASE P | ○ | ○ | ○ | ○ | ※NO DEFECTIVE DMA<br>①ANY ORDER OF BANDS |

○ : NORMAL DMA,  × : ABNORMAL DMA

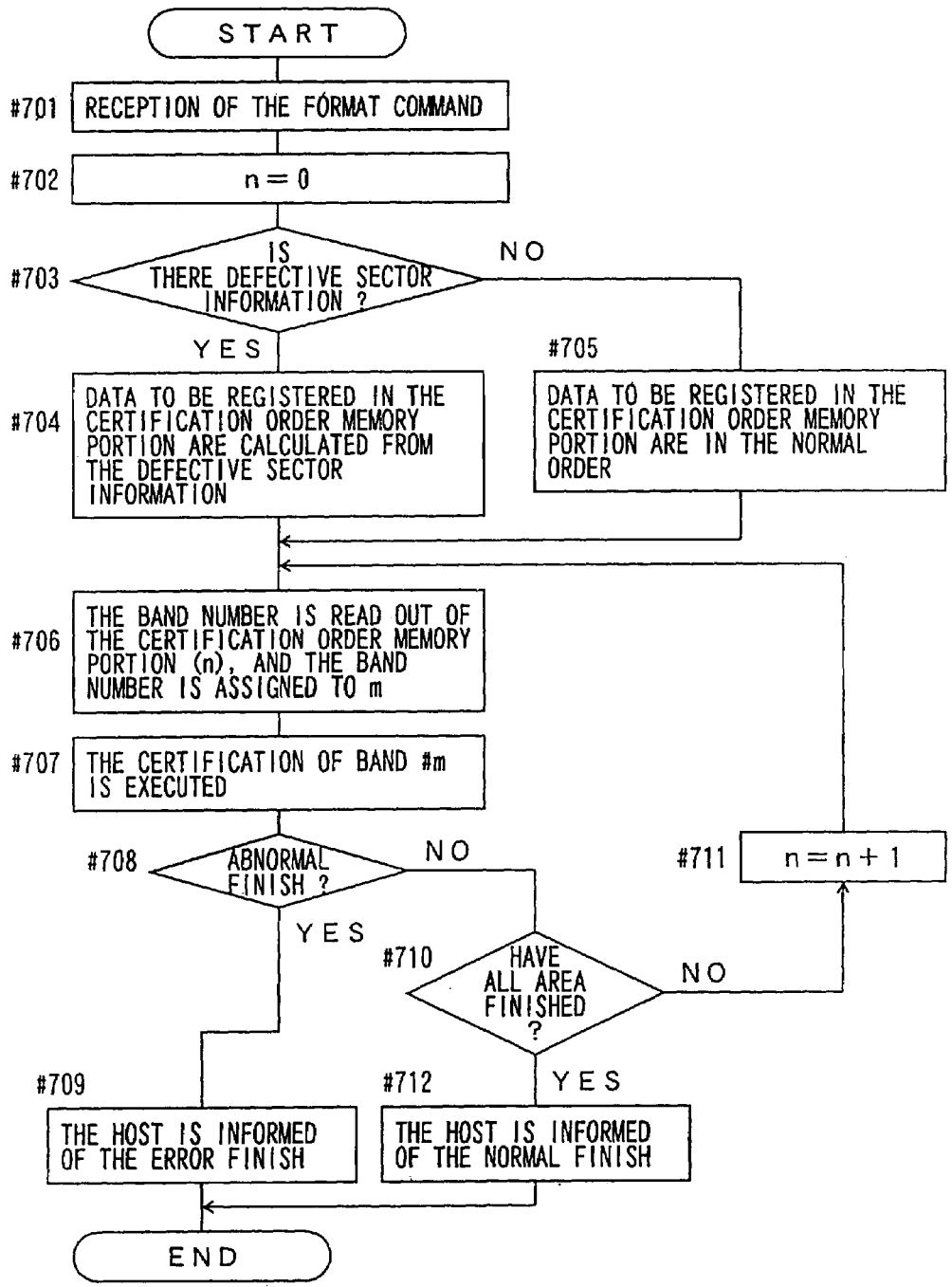

Fig. 18

| | Bit7 | 6 | 5 | 4 | 3 | 2 | 1 | Bit0 |
|---|---|---|---|---|---|---|---|---|
| 1st INSPECTION ZONE | Reserve | | | | BAND NUMBER | | | |
| 2nd INSPECTION ZONE | Reserve | | | | BAND NUMBER | | | |
| ... | ... | | | | ... | | | |
| 21st INSPECTION ZONE | Reserve | | | | BAND NUMBER | | | |
| 22nd INSPECTION ZONE | Reserve | | | | BAND NUMBER | | | |

Fig. 19

|  | Bit7 | 6 | 5 | 4 | 3 | 2 | 1 | Bit0 |
|---|---|---|---|---|---|---|---|---|
| 1st INSPECTION ZONE | L/G 1:L 0:G | Reserve | | | BAND NUMBER | | | |
| 2nd INSPECTION ZONE | L/G 1:L 0:G | Reserve | | | BAND NUMBER | | | |
| ... | ... | ... | | | ... | | | |
| 43rd INSPECTION ZONE | L/G 1:L 0:G | Reserve | | | BAND NUMBER | | | |
| 44th INSPECTION ZONE | L/G 1:L 0:G | Reserve | | | BAND NUMBER | | | |

※L：Land, G：Groove

METHOD OF FORMATTING A DISK RECORDING MEDIUM AND INFORMATION RECORDING APPARATUS

This is a divisional of application Ser. No. 10/428,552, filed May 2, 2003 U.S. Pat. No. 6,744,714, which is a divisional of application Ser. No. 09/703,848, filed Nov. 1, 2000, now U.S. Pat. No. 6,587,418.

BACKGROUND OF THE INVENTION

1. Field of the Invention

The present invention relates to a method of formatting a disk recording medium in which data recording area is divided into plural zones in the radial direction, and defect information is managed for each of the plural zones, a recording medium that is formatted by this method and an apparatus for recording and reproducing digital information using the disk recording medium.

2. Description of the Prior Art

Recently, a process time necessary for formatting (i.e., initializing) a disk recording medium such as an optical disc or a magneto-optic disk becomes longer because of high density and large storage capacity. For example, a magneto-optic disk (MO) having the storage capacity of 1.3 gigabytes that has been in the practical use recently requires approximately 20 minutes of process time. A magneto-optic disk having the storage capacity of 2.6 gigabytes that is under development will requires nearly an hour of process time for formatting process. The term "format" in this specification means so-called physical format.

In the formatting process, certification is performed, i.e., a predetermined bit pattern is recorded over the entire data recording area and reproduced for verifying. If a defect (a defective sector) is detected, an alternative sector is assigned, and a list of the alternation information is recorded in a management information recording area that is called a defect management area (DMA). Normally, four DMA areas are provided to a disk recording medium, i.e., two at the most inner radius and two at the most outer radius of the disk, and memorize the same alternation information.

A recent disk recording medium normally has a data recording area that is divided into plural zones in the radial direction. A rotation speed is changed for each zone in the ZCAV type, while a linear speed for reading is changed for each zone in the ZCLV type. A spare area for the above-mentioned alternative sector is provided to each zone. For example, the data recording area of a magneto-optic disk having the storage capacity of 640 megabytes is divided into eleven zones, while the data recording area of a magneto-optic disk having the storage capacity of 1.3 gigabytes is divided into eighteen zones. In accordance with the kind of a disk recording medium, a term "band" is used instead of "zone".

Conventionally, in an inspection stage of a disk recording media, for example, the above-mentioned formatting process is performed by a unit of plural sectors sequentially from the inner radius to the outer radius of the disk recording medium or in the opposite direction. For example, in a magneto-optic disk having storage capacity of 128 megabytes, 230 megabytes, 540 megabytes or 640 megabytes, a logical start address (LBA0) is located in the most inner radius. In these magneto-optic disks, the formatting process is performed sequentially from the inner radius to the outer radius. In a magneto-optic disk having storage capacity of 1.3 gigabytes, a logical start address (LBA0) is located in the most outer radius, and the formatting process is performed sequentially from the outer radius to the inner radius.

An example of the conventional formatting process will be explained with reference to FIGS. 1 to 3. FIG. 1 is a block diagram concerning the formatting process of the conventional magneto-optic disk drive. FIG. 2 shows a table of the order of the formatting process. FIG. 3 is a flowchart of the formatting process.

When a host 11 issues the command for a formatting magneto-optic disk 13 to a magneto-optic disk drive 12 (Step #101), a formatting portion 14 of the magneto-optic disk drive 12, as shown in FIG. 2, determines the formatting order of zone of the magneto-optic disk 13 in accordance with the ascending order of the logical address (Step #102). Erasing, writing and verifying processes are performed for each zone. If an error occurs, retry processes are repeated for predetermined times (Step #103). Write data are initializing data that can be set, e.g., a hexadecimal value "CF23" as a default value.

If the error is not canceled by the retry (YES in Step #104), the sector is considered to be a defective sector, and an alternative sector is assigned and defect information (i.e., a primary defect location; PDL) is registered in the DMA (Step #106). Before Step #106, it is checked whether the accumulated number of defects has exceeded the allowable total number of defects (Step #105). The allowable total number of defects is determined as a standardized value in accordance with the kind of a recording medium. For example, total 4,437 defects are allowed to a magneto-optic disk having the storage capacity of 1.3 gigabytes. If the number of defects has exceeded the standardized value, the magneto-optic disk drive 12 halts the formatting process and informs the host 11 of an error that the number of defects has exceeded the standardized value, i.e., of a defect number exceeding error (Step #110). In this case, the magneto-optic disk 13 cannot be used since the formatting process has not been completed.

If the number of defects does not exceed the standardized value, the formatting process continues. When the format of the designated zone has finished (YES in Step #107), the next zone is formatted by repeating the formatting process. When all zones have been formatted (YES in Step #108), the magneto-optic disk drive 12 informs the host 11 of normal completion of the formatting process (Step #109) and finishes the process.

The above-mentioned physical format is performed for erasing all data of a recording medium or for reexamining a recording medium and reregistering defective sectors so that the recording medium can be used securely after long term use has increased errors or elongated access time of the recording medium.

As explained above, since the conventional formatting process is performed sequentially from the inner radius to the outer radius of the disk recording medium or in the opposite direction in accordance with the ascending order of the logical address, the defect number exceeding error can occur in the final zone or just before the final zone. In this case, the process time used for the formatting process before that is wasted since the recording medium cannot be used. As mentioned above, almost 20 minutes can be waste in the case of formatting a magneto-optic disk having the storage capacity of 1.3 gigabytes.

This time loss can be an obstacle to productivity improvement in an inspection stage of a disk recording media. In addition, when a user performs the physical format of a disk recording medium, it would not be endurable if the recording medium cannot be used because of formatting error after waiting for the long formatting process time.

Furthermore, a user has to wait a long time before the physical format is completed in the conventional formatting process even if only a part of the recording area of the recording medium is used, since the conventional formatting process performs the physical format of all areas.

SUMMARY OF THE INVENTION

The object of the present invention is to detect the defect number exceeding error at the earliest possible time in the formatting process of a disk recording medium if the recording medium becomes unusable because of the defect number exceeding error finally. Another object of the present invention is to shorten the time necessary for the physical format.

A method of the present invention for formatting a disk recording medium comprises the steps of dividing a data recording area of the disk recording medium into plural zones in the radial direction, formatting the plural zones in a discontinuous order, and managing defect information for each of the plural zones.

A disk recording medium of the present invention comprises a data recording area being divided into plural zones in the radial direction, a defect management area for managing defect information for each of the plural zones, and the plural zones being formatted in a discontinuous order.

An apparatus of the present invention for recording and reproducing digital information uses a disk recording medium in which a data recording area is divided into plural zones in the radial direction, and defect information is managed for each of the plural zones. A first aspect of the apparatus comprises means for formatting the disk recording medium, means for detecting defect information of the disk recording medium, and means for controlling the order of format by informing the formatting means of a zone to be formatted next in the decreasing order of the number of defects in accordance with the defect information detected by the detecting means.

A second aspect of the apparatus comprises means for formatting the disk recording medium, means for detecting medium information such as a manufacturer of the disk recording medium, and means for controlling the order of format by informing the formatting means of a zone to be formatted next in the preregistered order corresponding to the medium information detected by the detecting means. Preferably, a defect probability for each zone (a characteristic table) that alters in accordance with the medium information such as a manufactures is memorized in a memory of the controlling means.

A third aspect of the apparatus comprises means for formatting the disk recording medium, and means for controlling the order of format by informing the formatting means of a zone to be formatted next at an interval of one or more zones and of the neighboring zones if the number of defects in the zone is higher than the threshold value.

Preferably, in the first through the third aspects of the apparatus, the disk recording medium is a land and groove recording type in which data are recorded in both lands and grooves, defect information of each zone is managed for lands and grooves separately, and the order of format is determined for the lands and the grooves of each zone.

In a fourth aspect, the apparatus formats a DMA area for recording the defect information before formatting a user data area, and finishes the formatting process as an error without formatting the user data area if a defect occurs during the formatting process of the DMA area.

Preferably, plural DMA areas for recording the same defect information are provided at plural positions of the disk recording medium, and the apparatus formats the usher data area from the zone in which the DMA area having a defect is included if a part of the DMA areas has a defect and other parts have no defect.

According to the above-mentioned formatting method and information recording and reproducing apparatus, the formatting process is performed not in sequential order from the inner radius to the outer radius of the disk recording medium or in the opposite direction in accordance with the order of the logical address as conventional, but in the discontinuous order such as the decreasing order of the number of defects that were detected in the last format or the number of potential defects that can be prefigured in accordance with characteristics of the disk recording medium. Therefore, when the defect number exceeding error occurs, it can be detected at an earlier stage than the conventional formatting process in which the format is performed in accordance with the order of the logical address.

Another method according to the present invention for formatting a disk recording medium that has a data recording area being divided into plural zones in the radial direction and defect information being managed for each of the plural zones comprises the steps of obtaining SDL (secondary defect location) information of the disk recording medium by defect information obtaining means, detecting zones having the SDL information as zones to be certified, and certifying only the zones that were detected to be certified by erasing, writing and verifying.

Still another method according to the present invention for formatting a disk recording medium comprises the steps of reading data of each zone by initialized data reading portion, detecting zones having data except initialized data as zones to be certified, and certifying only the zones that were detected to be certified by erasing, writing and verifying. In order to decide whether a zone is to be certified or not, the initialized data reading portion can read all data of each zone. However, it is preferable that the initialized data reading portion read a part of data, e.g., a predetermined number of sectors of the leading portion, the middle portion and the end portion of each zone.

It is preferable that the above-mentioned formatting methods further comprise the step of informing a host of the time until the finish of the formatting process by process time informing means.

It is also preferable that the above-mentioned formatting methods further comprise the step of performing quasi certification of the zones that were not detected to be certified. As the quasi certify, there are two well-known methods. In one method, only a read check of data is performed. In the other method, only a read check of ECC (data for check) is performed.

According to the above-mentioned formatting method, total time necessary for the physical format can be shortened since the certification including the steps of erasing, writing and verifying is not executed for zones that do not need the certification, or the quasi certification is executed for these zones instead of the normal certification.

BRIEF DESCRIPTION OF THE DRAWINGS

FIG. 1 is a block diagram concerning the formatting process of the conventional magneto-optic disk drive.

FIG. 2 shows a table of the order of the formatting process.

FIG. 3 is a flowchart of the formatting process in the conventional magneto-optic disk drive.

FIG. 4 is a block diagram concerning the formatting process of a magneto-optic disk drive according to the first embodiment of the present invention.

FIG. 5 shows a table of the formatting process order in the magneto-optic disk drive corresponding to a first embodiment of the present invention.

FIG. 6 is a flowchart of the formatting process in the magneto-optic disk drive corresponding to the first embodiment of the present invention.

FIG. 7 shows a table of the formatting process order in the magneto-optic disk drive according to a second embodiment of the present invention.

FIG. 8 is a flowchart of the formatting process in the magneto-optic disk drive according to the second embodiment of the present invention.

FIG. 9 shows a table of the formatting process order in the magneto-optic disk drive according to a third embodiment of the present invention.

FIG. 14 shows a table of the information memorized in the DMA inspection result memory portion of the magneto-optic disk drive according to the fourth embodiment of the present invention.

FIG. 15 is a detail flowchart of the process formatting the user data area in the magneto-optic disk drive according to the fourth embodiment of the present invention.

FIG. 16 shows a table of an example of calculating the number of the band to be formatted next in accordance with the data memorized in the inspection result memory portion of the magneto-optic disk drive according to the fourth embodiment of the present invention.

FIG. 17 is a flowchart showing an example in which the first embodiment is combined to the fourth embodiment of the present invention for determining the order of the user data area formatting.

FIG. 18 shows a table of information memorized in the format order memorizing portion of the magneto-optic disk drive according to the fourth embodiment of the present invention.

FIG. 19 shows a table of information memorized in the format order memorizing portion when the magneto-optic disk is a land and groove type recording medium in which data are recorded both in lands and grooves.

DESCRIPTION OF THE PREFERRED EMBODIMENTS

Figure 10:
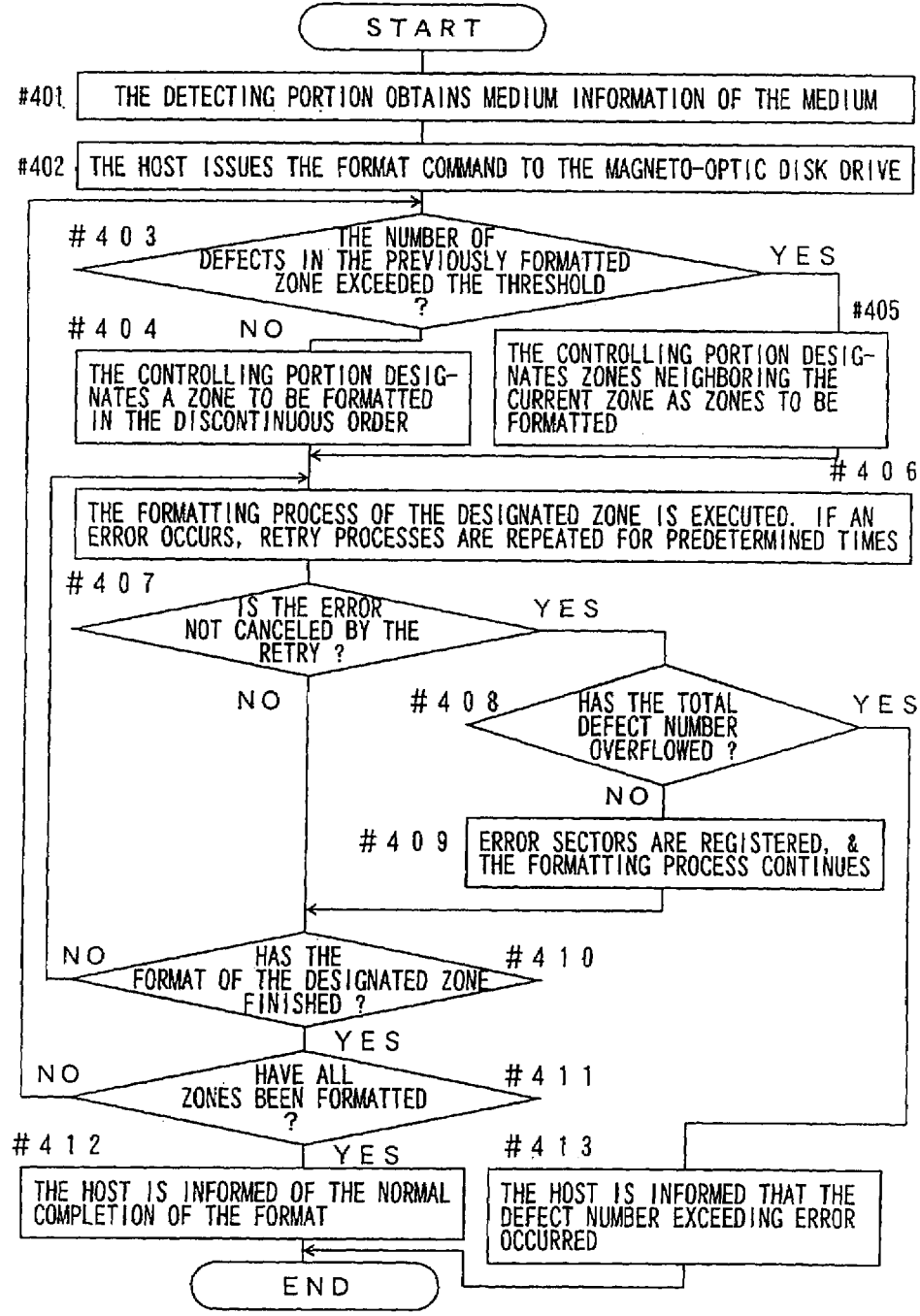
FIG. 10 is a flowchart of the formatting process in the magneto-optic disk drive according to the third embodiment of the present invention.

Hereinafter, the present invention will be explained in detail with reference to embodiments and accompanied drawings.

A first embodiment of the present invention will be explained with reference to FIGS. 4 to 6. FIG. 4 is a block diagram concerning the formatting process of a magneto-optic disk drive according to a first embodiment of the present invention. FIG. 5 shows a table of the formatting process order. FIG. 6 is a flowchart of the formatting process.

As an example, a magneto-optic disk 23 that was formatted is formatted again. In this case, defect information (e.g., the number of defects, physical addresses of the defects) of the magneto-optic disk 23 that was detected in the last formatting process is recorded in the DMA area. If the magneto-optic disk 23 has been used for a long time, the number of defects may increase because the recording film may be deteriorated since the last formatting process. However, the distribution of the number of defects for each zone does not alter usually. Therefore, there is a high possibility that the zone having many defects at the last formatting process will have many defects in the new formatting process, too.

When the magneto-optic disk 23 is inserted in a magneto-optic disk drive 22, a detecting portion 24 of the magneto-optic disk drive 22 obtains defect information of the last formatting process that is recorded in the DMA area (Step #201). When a host 21 issues a command for formatting the magneto-optic disk 23 to the magneto-optic disk drive 22 (Step #202), a controlling portion 25 of the magneto-optic disk drive 22 informs the formatting portion 26 of a zone to be formatted in the decreasing order of the number of defects in accordance with the defect information of the last formatting process obtained by the detecting portion 24 (Step #203).

In the example of FIG. 5, the formatting process starts from No. 15 zone having the most defects. Then, the formatting process is performed in the order of No. 11 zone, No. 2 zone, No. 8 zone and No. 5 zone. After that, zones having no defect are formatted in the order of zone number.

In Step #204, the designated zone is formatted. If an error occurs, retrials are performed predetermined times. If the error is not canceled after the retrials (YES in Step #205), it is considered that the sector is a defective sector, and an alternative sector is assigned to the sector, which is registered as defect information in the DMA (Step #207). However, before the process, the accumulated number of defects up to then is checked. If the accumulated number of defects has exceeded the allowable total number of defects, the formatting process is halted and the host 21 is informed of the occurrence of the defect number exceeding error (Step #211).

If the number of defects has not succeeded the allowable total number, the formatting process continues. When the formatting process of the designated zone is finished (YES in Step #208), the next zone is formatted in the same way. When all zones are formatted (YES in Step #209), the host 21 is informed of the normal completion of the formatting process (Step #210), and the process is finished.

According to this embodiment, the formatting process is executed in the decreasing order of the potential defects that can be prefigured in accordance with the defect information detected in the last formatting process. Therefore, when the defect number exceeding error occurs, it can be detected at an earlier stage than the conventional formatting process in which the format is performed in accordance with the order of the logical address. In other words, the waiting time until the defect number exceeding error occurs can be shortened.

Next, a second embodiment of the present invention will be explained with reference to FIGS. 4, 7 and 8. FIG. 7 shows a table of the formatting process order in the magneto-optic disk drive according to the second embodiment of the present invention. FIG. 8 is a flowchart of the formatting process. The block diagram concerning the formatting process is the same as the first embodiment shown in FIG. 4.

In the present embodiment, the formatting process is executed in the decreasing order of the number of potential defects in accordance with medium information such as a manufacturer that is recorded as control track information of the magneto-optic disk 23. In general, a magneto-optic disk has a tendency of uneven distribution of defects in the inner or the outer zone depending on a manufacturer or other factors. Therefore, the execution of the formatting process in the decreasing order of the number of potential defects in accordance with medium information such as a manufacturer can shorten the waiting time in the formatting process until the defect number exceeding error occurs in the same way as the first embodiment.

When the magneto-optic disk 23 is inserted in the magneto-optic disk drive 22, the detecting portion 24 of the magneto-optic disk drive 22 obtains the medium information that is recorded in the control track information area (Step #301). When the host 21 issues a command for formatting the magneto-optic disk 23 to the magneto-optic disk drive 22 (Step #302), the controlling portion 25 of the magneto-optic disk drive 22 informs the formatting portion 26 of a zone to be formatted in the decreasing order of the number of potential defects that is registered corresponding to each medium information that is detected by the detecting portion 24 (Step #303).

In the example of FIG. 7, the formatting process starts from No. 15 zone whose number of the potential defects is the largest. Then, the formatting process is performed in the order of No. 11 zone, No. 2 zone, No. 8 zone and No. 5 zone. After that, zones whose number of the potential defects is the smallest are formatted in the order of zone number.

The controlling portion 25 memorizes a table of the relationship between the medium information such as a manufacturer and the decreasing order of the number of potential defects in advance. The controlling portion 25 determines the order of zones to be formatted by referring this table with the medium information obtained by the detecting portion 24. The medium information that is used for estimating the decreasing order of the number of potential defects can include not only the manufacturer but also a production lot number and a stamper (die) number used in the manufacturing process.

The process from Step #304 through Step #311 in FIG. 8 is the same as the Step #204 through Step #211 of the first embodiment shown in FIG. 6, so the explanation is omitted.

Next, a third embodiment of the present invention will be explained with reference to FIGS. 4, 9 and 10. FIG. 9 shows a table of the formatting process order in the magneto-optic disk drive according to the third embodiment of the present invention. FIG. 10 is a flowchart of the formatting process. The block diagram concerning the formatting process is the same as the first embodiment shown in FIG. 4.

In the present embodiment, the magneto-optic disk 23 has the storage capacity of 1.3 gigabytes, and the data recording area is divided into 18 zones. The allowable maximum number of defects is 4,437. It is assumed that zones of No. 0 through No. 12 have no defect, and zones of No. 13 through No. 17 have 100, 500, 1,000, 2,000 and 838 defects, respectively as shown in FIG. 9, though it is an extreme example. In this case, since the total number of defects is 4,438 exceeding the allowable maximum number of defects 4,437, a defect number exceeding error occurs. If the formatting process is exceeded in the continuous order from No. 0 zone to No. 17 zone as in the conventional method, the defect number exceeding error will occur just before the formatting process time (approximately 20 minutes) passes.

In the present embodiment, the controlling portion 25 informs the formatting portion 26 of a zone to be formatted next at an interval of one or more zones. In an example of FIG. 9, zones are formatted at the interval of two zones such a way as No. 0 zone, No. 3 zone and No. 6 zone. If the number of defects in a zone is larger than a predetermined threshold, zones neighboring the current zone are designated to be formatted prior to the next zone at the interval and informed to the formatting portion 26.

In the example of FIG. 9, the threshold is preset to 200. The formatting process proceeds at the interval of two zones to the sixth zone of No. 15, when the number of defects exceeds the threshold of 200. If the number of defects in No. 15 zone does not exceed the threshold of 200, the formatting process goes on from the No. 1 zone at the interval of zones. However, the number of defects exceeds 200 (becomes 1,000) in the example of FIG. 9, so the unformatted zones neighboring the No. 15 zone are formatted prior to the next zone at the interval. In the example of FIG. 9, total four zones, i.e., two zones before and the two zones after the No. 15 zone (No. 13, 14, 16 and 17 zones) are unformatted. Therefore, these four zones are formatted before backing to No. 1 zone so as to continue the formatting process at the interval of two zones.

However, in the example of FIG. 9, when No. 17 zone that is the tenth object of the formatting process is formatted, the accumulated number of defects becomes 4,438, which exceeds the allowable maximum number of defects of 4,437. Thus, a defect number exceeding error occurs. Namely, the defect number exceeding error occurs earlier than the conventional method in which the defect number exceeding error occurs in the eighteenth (the last) zone, so that the waste of time can be reduced.

In the flowchart shown in FIG. 10, the detecting portion 24 obtains the medium information of the magneto-optic disk 23 (Step #401). Then, the host 21 issues the format command to the magneto-optic disk drive 22 (Step #402). The controlling portion 25 informs the formatting portion 26 of the zone to be formatted next at the interval of one or plural zones (i.e., in a discontinuous order) as explained above (Step #404). However, after the second repeating process, it is checked whether the number of defects in the previously formatted zone has exceeded the threshold (Step #403). If the number of defects has not exceeded the threshold, the next zone to be formatted is designated at the interval (in a discontinuous order) as explained above. If the number of defects has exceeded the threshold, zones neighboring the current zone are informed to the formatting portion 26 as the next zone to be formatted (Step #405). The process from Step #406 through Step #413 is the same as the Step #204 through Step #211 of the first embodiment shown in FIG. 6, so the explanation is omitted.

This embodiment utilizes the characteristics that zones having many defects have the tendency to gather in an area and the formatting process is executed at the interval of one or more zones (in a discontinuous order), so that the area having many defects can be detected as early as possible. If a zone whose number of defects is larger than the threshold is detected, zones neighboring the current zone are formatted next, since there is high possibility that these zones also have defects. Thus, if the magneto-optic disk 23 generates the defect number exceeding error, it can occur at as early stage as possible in the formatting process.

Next, a fourth embodiment of the present invention will be explained.

Figure 11:
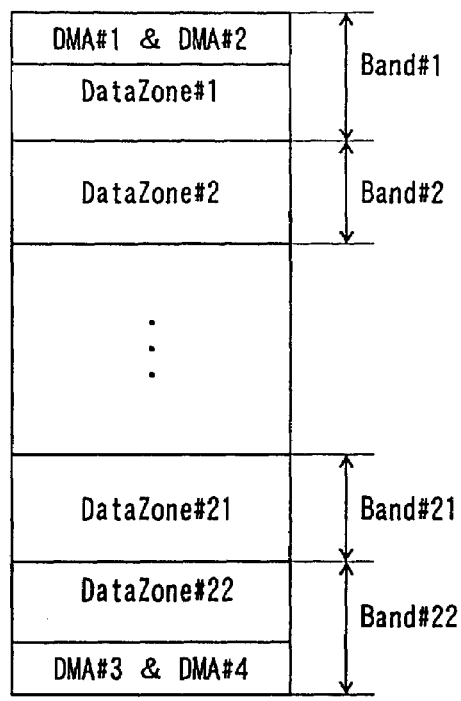
FIG. 11 shows a map of a magneto-optic disk concerning a fourth embodiment of the present invention.

FIG. 11 shows a map of a magneto-optic disk concerning a fourth embodiment of the present invention. The magneto-optic disk of this embodiment has a data recording area that is divided into twenty-two bands (Band #1 through Band #22). These bands correspond to the zones in the above-explained embodiment in which the data recording area is divided into plural zones in the radial direction. It depends on the kind of a disk recording medium which term is used, "zone" or "band," though there is not a special difference between them. In the magneto-optic disk of FIG. 11, the first band (Band #1) includes two DMA areas (DMA #1 and DMA #2), and the 22nd band (Band #22) includes two DMA areas (DMA #3 and DMA #4).

Figure 12:
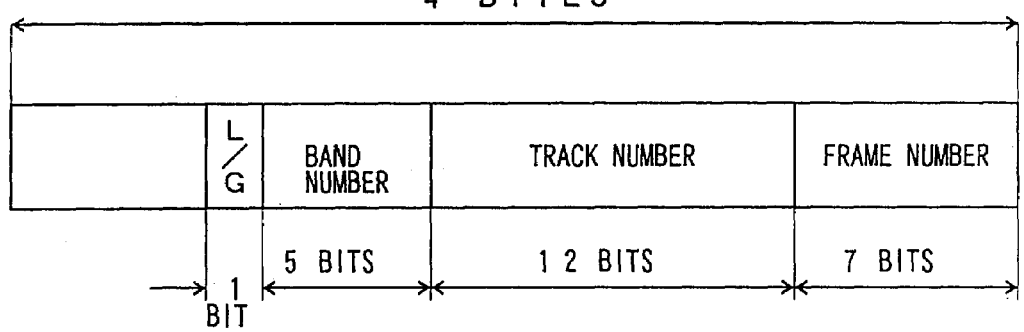
FIG. 12 shows a structure of a physical address indicating information of a sector that is a unit for data recording in the data recording area.

FIG. 12 shows a structure of a physical address indicating information of a sector that is a unit for data recording in the data recording area. In this example, the physical address is made of four bytes including five bits of band number, twelve bits of track number and seven bits of frame number. In addition, one bit of flag is included for recognizing a land or a groove in the case of a land and groove recording type magneto-optic disk in which data are recorded in both lands and grooves.

Figure 13:
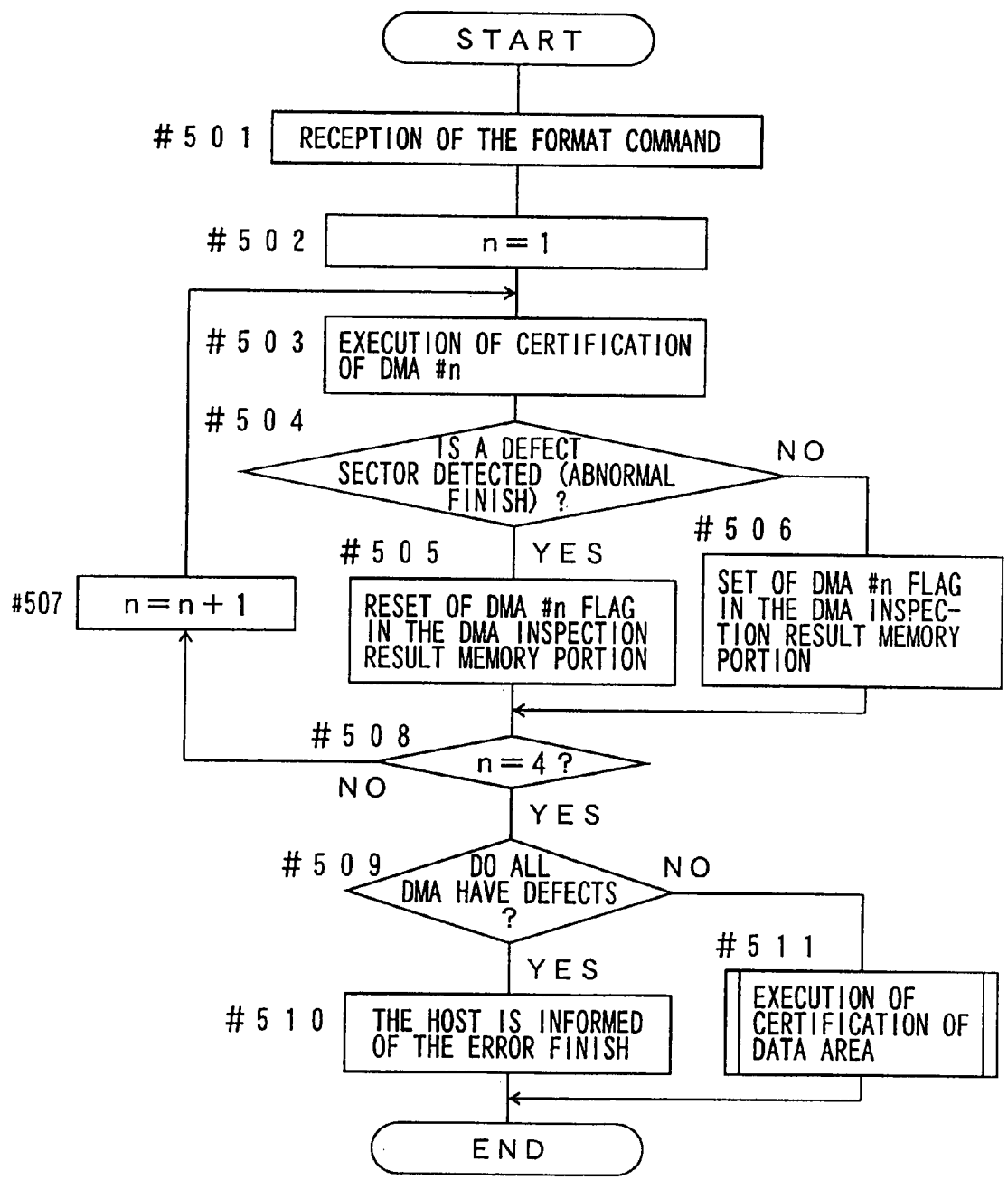
FIG. 13 is a flowchart showing a process that the controlling portion of the magneto-optic disk drive performs in the fourth embodiment of the present invention.

FIG. 13 is a flowchart showing a process that the controlling portion of the magneto-optic disk drive of this embodiment performs. The block diagram concerning the formatting process is the same as the above-mentioned embodiments shown in FIG. 4.

When receiving the format command from the host 21 (Step #501), the controlling portion 25 of the magneto-optic disk drive 22 executes the format (also referred to as certification) of the DMA #1 area first (Step #502 and Step #503). In this process, predetermined data (e.g., data incrementing from zero) are written on each sector from the leading sector to the end sector of the DMA #1. Then, the data are read out and are verified. As a result, if a defective sector is detected (YES in Step #504), it is memorized in a DMA inspection result memory portion shown in FIG. 14 that there is a DMA defect. Namely, a DMA #1 flag is reset (Step #505). If the defective sector is not detected (NO in Step #504), the DMA #1 flag is set (Step #506).

Next, the DMA number is incremented (Step #507), and the DMA #2 area is formatted by the formatting process from Step #503 through Step #506. In the same way, the above-mentioned process is repeated until the DMA #4 area is formatted (YES in Step #508). Though four DMA areas are formatted in the order from the DMA #1 in this embodiment, the number of DMA areas and the order of formatting can be changed.

After all DMA areas are formatted, the data memorized in the DMA inspection result memory portion are read out. If it is decided that all DMA areas have defects (YES in Step #509), the formatting process of the user data area is not executed. The host is informed of the finish in error (Step #510), and the formatting process is finished. If there is at least one normal DMA area, the formatting process of the user data area is performed (Step #511).

If the all DMA areas have defects, the magneto-optic disk cannot be used normally. According to the above-mentioned process, such an error can be decided in the shortest period in the formatting process.

FIG. 15 is a detail flowchart of the process formatting the user data area, which is the process of Step #511 in the flowchart of FIG. 13. If a part of plural DMA areas has a defect, the formatting process is executed from the user data area of the band (zone) that includes the DMA area having a defect.

In FIG. 15, the band number of the DMA area having a defect is calculated in accordance with the data memorized in the inspection result memory portion shown in FIG. 14 (Step #601), and the user data area of this band is formatted first (Step #602). If the number of defective sectors overflows (YES in Step #603), the host is informed of an abnormal finish (finish in the defect overflow error) (Step #604), and the formatting process is finished. Otherwise (NO in Step #603), the process continues until all data areas are formatted (YES in Step #605).

Namely, in accordance with the data memorized in the inspection result memory portion, the number of a band to be formatted next is calculated (Step #606), and the process from Step #602 through Step #605 is repeated. When all data areas are formatted (YES in Step #605), the format result of the user data area is registered in the DMA (Step #607). The host is informed of the normal finish (Step #608), and the formatting process is finished.

FIG. 16 shows a table of an example of calculating the number of the band to be formatted next in accordance with the data memorized in the inspection result memory portion in Step #601 and Step #606 of FIG. 15. In a case A, all the four DMA areas have defects, and the process is finished without executing the formatting process of the user data area.

In the case B of FIG. 16, only the DMA #1 is normal, and the DMAs #2, #3 and #4 have defects. In this case, the user data area of the Band #22 including two defective DMA area (see FIG. 11) is formatted first. Next, the user data area of Band #1 including one defective DMA area is formatted. In the case C, only the DMA #2 is normal. In this case, the order of the formatting process is the same as the case B.

On the contrary in the case D and case E, the Band #1 includes two defective DMA area. Therefore, the user data area of the Band #1 is formatted first, and the user data area of the Band #22 including one defective DMA area is formatted next.

In the case F, two defective DMA areas are included in the Band #22, and the other two DMA areas are normal. In this case, the user data area of the Band #22 is formatted first, and any other band can follow. In the case G, H, I or J, one defective DMA area is included in each of Band #1 and Band #22, and the other two DMA areas are normal. In this case, any one of Band #1 and Band #22 is formatted first, and the other is formatted next. In the case K, two defective DMA areas are included in the Band #1, and the other two DMA areas are normal. In this case, the user data area of the Band #1 is formatted first, and any other band can follow.

In the cases L and N, one defective DMA area is included in the Band #22, and the remaining three DMA areas are normal. In this case, user data area of the Band #22 is formatted first, and any other band can follow. In the cases M and O, one defective DMA area is included in the Band

1, and the remaining three DMA areas are normal. In this case, the user data area of the Band #1 is formatted first, and any other band can follow. In the case P, each of the four DMA areas has no defect. In this case, the formatting process can be executed in any order.

As explained above, the formatting order is determined by deciding whether the user data area of the band including each DMA area has many potential defects in accordance with the format result of the plural DMA areas. Therefore, if the magneto-optic disk generates the defect number exceeding error, it can occur as early as possible in the formatting process.

In addition, concerning other user data areas of bands except that including the DMA area, the formatting order can be determined by the method explained in the above-mentioned embodiments, so that the defect number exceeding error can be detected as early as possible. For example, in the second formatting process or after the second, as explained in the first embodiment, the formatting process is executed in the decreasing number of potential defects in a band in accordance with the defect information of the magneto-optic disk that was detected in the last formatting process. Hereinafter, an example will be explained with reference to a flowchart shown in FIG. 17, in which the first embodiment is combined to the present embodiment for determining the order of formatting the user data area.

In general, the magneto-optic disk drive 22 performs the process of reading out the information of the DMA area of the magneto-optic disk 23 and memorizing the information in a memory within the magneto-optic disk drive 22 when the magneto-optic disk 23 is inserted. On this occasion, if the DMA has defect information detected in the last formatting process, a flag is set in the box (bit 0) of the DMA inspection result memory portion for indicating whether there is defective sector information as shown in FIG. 14.

In the flowchart shown in FIG. 17, when receiving the format command from the host 21 (Step #701), the controlling portion 25 of the magneto-optic disk drive 22 initializes a variable n to zero, which is used for reading out the number of a band to be formatted from the format order memorizing portion that will be explained later (Step #702). Then, the flag in the inspection result memory portion is checked, which indicates whether there is defective sector information (Step #703). If the flag is set, i.e., there is defective sector information, a band number is stored in the format order memorizing portion so that the formatting process is executed in the decreasing order of the number of defects in a band in accordance with the defect information detected in the last formatting process and memorized in the memory (Step #704). If the flag is not set, i.e., there is no defective sector information, a band number is stored in the format order memorizing portion so that the formatting process is executed in the normal order of the band number (Step #705).

FIG. 18 shows a table of information memorized in the format order memorizing portion. The defective sectors are registered as the defective sector information in a physical address format, which includes a band number, a track number and a frame number as shown in FIG. 12. Therefore, the band including a defective sector is decided by the band number within the physical address.

When the information memorized in the format order memorizing portion, i.e., the order of the band number in the formatting process is established as explained above, the controlling portion 25 reads the number of a band to be formatted first (n=0) out of the format order memorizing portion (Step #706), and executes the format of the band (Step #707). If the defect number overflow error occurs (YES in Step #708), the host 21 is informed of the finish in error, and the process is finished. If the defect number overflow error does not occur, until all data areas are formatted (YES in Step #710), the variable n is incremented (Step #711), and the process from the Step #706 through Step #710 is repeated. When all data areas are formatted (YES in Step #710), the host is informed of the normal finish (Step #712), and the formatting process is finished.

FIG. 19 shows a table of information memorized in the format order memorizing portion when the magneto-optic disk 23 is a land and groove type recording medium in which data are recorded both in lands and grooves. In this example, when calculating the number of defective sectors for each band, it is calculated for the land and the groove separately, so that the order of the formatting process can be determined not only by the band number but also by the land or the groove unit. Therefore, the number indicating the order of the inspection in the left end box can be 44 kinds from the first to the forty-fourth, i.e., two times the number in the table of FIG. 18. Bit 7 is a bit for discriminating the land or the groove.

Figure 20:
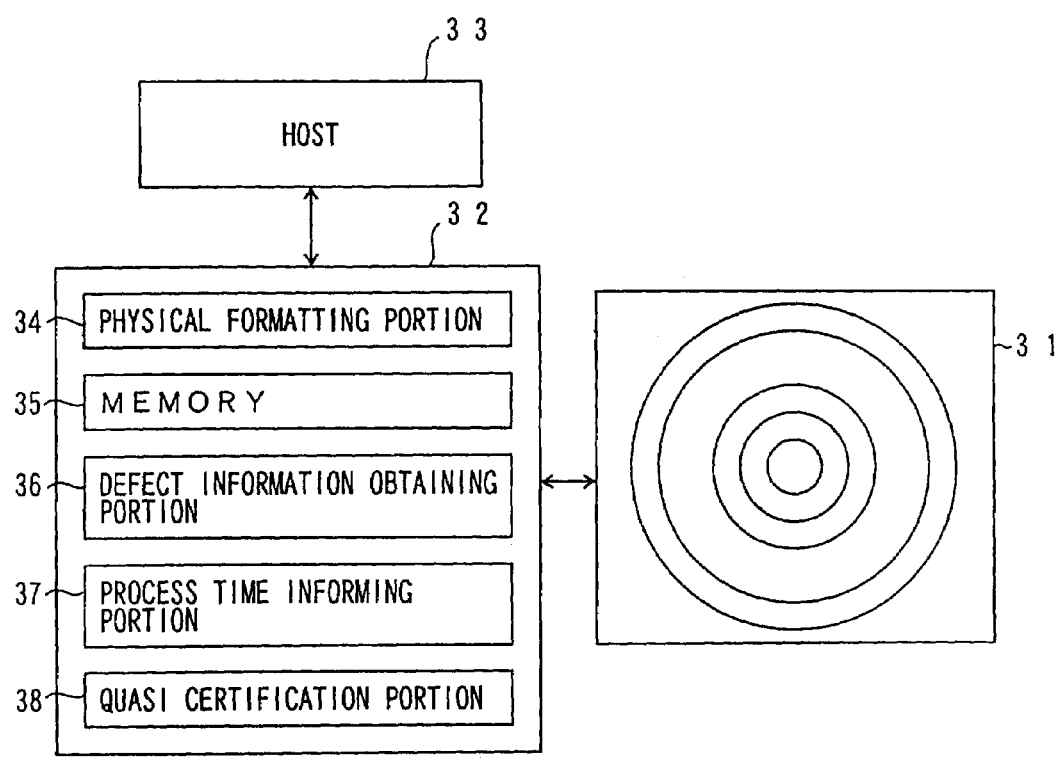
FIG. 20 is a block diagram concerning a formatting process of a magneto-optic disk drive according to a fifth embodiment of the present invention.

FIG. 20 is a block diagram concerning a formatting process of a magneto-optic disk drive according to a fifth embodiment of the present invention. In FIG. 20, a numeral 31 denotes a magneto-optic disk medium, a numeral 32 denotes a magneto-optic disk drive for writing and reading the magneto-optic disk medium 31, and a numeral 33 denotes a host for issuing a physical format command to the magneto-optic disk drive 32.

The magneto-optic disk drive 32 includes a physical formatting portion 34 for writing initializing data on the magneto-optic disk medium 31 for the certification, a memory 35, a defect information obtaining portion 36, a process time informing portion 37, and a quasi certification portion 38.

The memory 35 memorizes information from the host 33 and defect information of the magneto-optic disk medium 31. The defect information obtaining portion 36 obtains sector addresses of a primary defect location (PDL) and a secondary defect location (SDL) included in the DMA when the magneto-optic disk medium 31 is inserted in the magneto-optic disk drive 32. The process time informing portion 37 calculates the time necessary for the physical format and informs the host of the time. The operation of the quasi certification portion 38 will be explained later.

Figure 21:
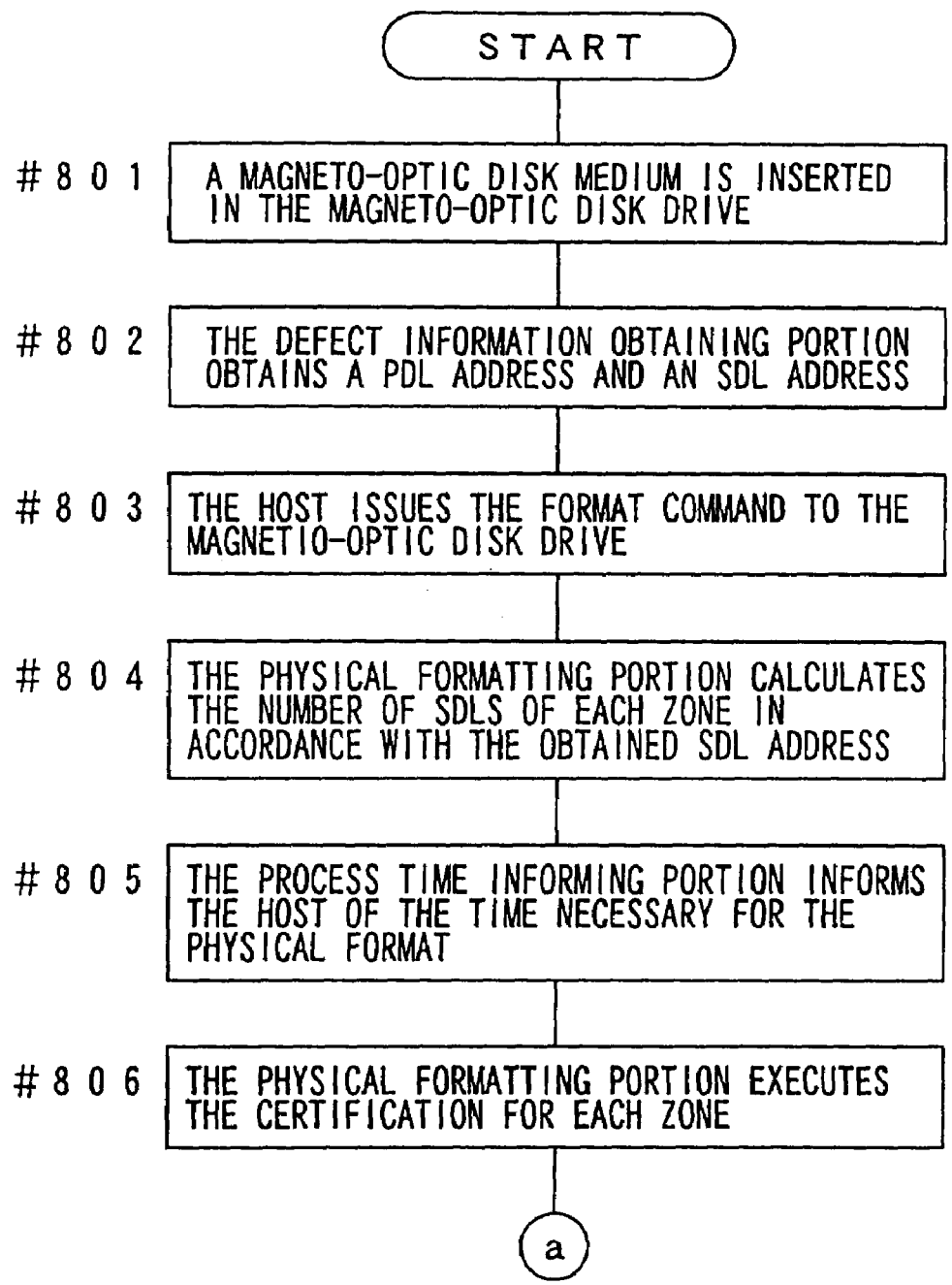
FIG. 21 shows the first half of a flowchart of a physical formatting process according to the fifth embodiment of the present invention.
Figure 22:
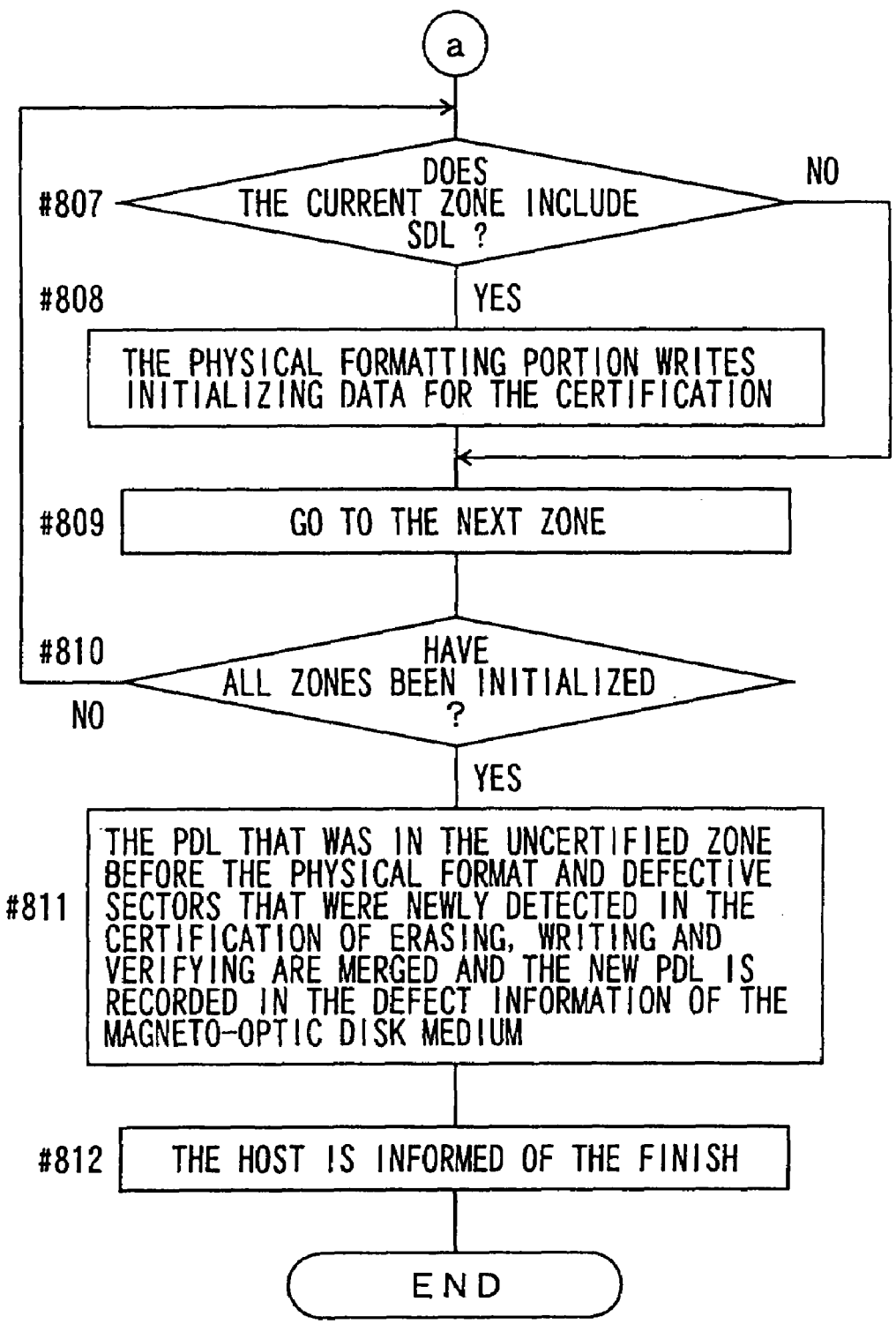
FIG. 22 shows the latter half of a flowchart of a physical formatting process according to the fifth embodiment of the present invention.

FIGS. 21 and 22 show a flowchart of a physical formatting process according to the fifth embodiment of the present invention. In Step #801, a magneto-optic disk medium 31 is inserted in the magneto-optic disk drive 32, when the defect information obtaining portion 36 obtains a PDL address and an SDL address, which are stored in the memory 35 (Step #802). In Step #803, the host 33 issues the format command to the magneto-optic disk drive 32, when the physical formatting portion 34 calculates the number (including zero) of SDLs of each zone in accordance with the SDL address that was read out of the memory 35 (Step #804).

In Step #805, the process time informing portion 37 calculates a total time of the physical format process in accordance with an average time of certification for each zone. Namely, the average certification times for zones to be certified are added so as to calculate the time necessary for the physical format, and the host is informed of the time. A user can do other jobs until the physical format is finished. The process of Step #805 (or the process time informing portion 37) is not essential but can be omitted.

In the process after Step #806, the physical formatting portion 34 executes the certification for each zone. In Step #807, it is checked whether the current zone includes SDL. If there is an SDL, initializing data are written in Step #808 for the certification process, and the next zone will be processed (Step #809). If there is no SDL in the current zone, the process goes to Step #809 without executing the certification. Defective sectors that were detected in the certification process are memorized in a memory 35.

In Step #810, it is checked whether all zones have been initialized (formatted or certified). The process from Step #807 through Step #810 is repeated until all zones are initialized. When all zones are initialized, the physical formatting portion 34 merges the PDL that was in the uncertified zone before the physical format and defective sectors that were newly detected in the certification of erasing, writing and verifying so as to record it as a new PDL in the defect information recording area (DMA) of the magneto-optic disk medium 31 in Step #811. In the final Step #812, the end of the physical format is informed to the host 33 and the process is finished.

In general, it is considered that a zone having no SDL (secondary defect information) has not been used after the physical format or has not generated a writing error, so the zone does not require the certification again. According to this presumption, the present embodiment can shorten the time necessary for the physical format by omitting the certification of zones having no SDL in the physical format.

In a variation of the above-mentioned embodiment, a quasi certification can be executed instead of omitting the certification of the current zone having no SDL in Step #807. The quasi certification portion 38 shown in FIG. 20 can work for this process. In FIG. 22, if it is NO in Step #807, the quasi certification portion 38 executes the quasi certification before going to Step #809.

There are two kinds of well-known methods for the quasi certification. One of them is a quasi certification that performs only a read check of data (verify with initialized data such as "CF23" in hexadecimal). The other is a quasi certification that performs only a read check of ECC (data for check). The latter requires shorter time for the process but cannot detect an error that beyond the detection ability of ECC. In any method, the total time of format process becomes longer than the case where no certification process is executed, but the reliability of the format increases. In addition, the time necessary for the quasi certification is still shorter than the case where the certification of erasing, writing and verifying is performed.

When the quasi certification is performed, defective sectors that were detected in the quasi certification and defective sectors that were detected in the certification of erasing, writing and verifying are merged, and the newly generated PDL is recorded in the defect information recording area (DMA) of the magneto-optic disk medium 31 in Step #811 of FIG. 22.

Figure 23:
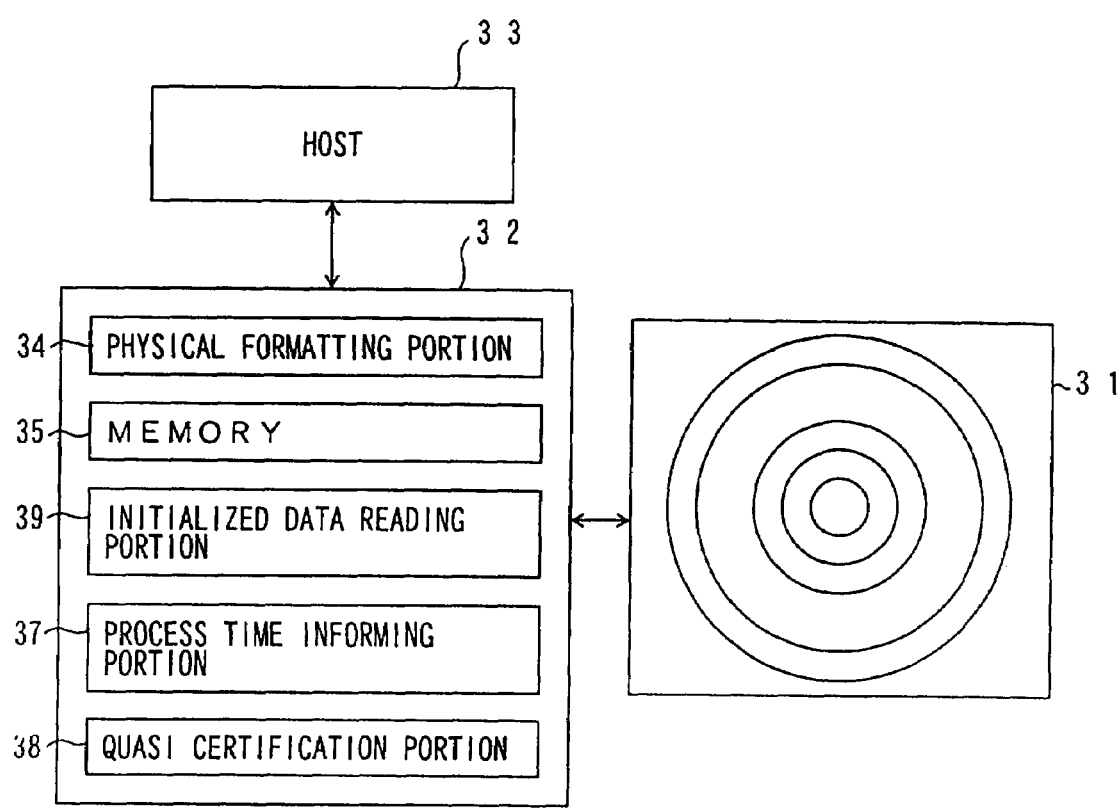
FIG. 23 is a block diagram concerning a formatting process of a magneto-optic disk drive according to a sixth embodiment of the present invention.

FIG. 23 is a block diagram concerning a formatting process of a magneto-optic disk drive according to a sixth embodiment of the present invention. There is only one difference between the sixth embodiment and the fifth embodiment shown in FIG. 20. It is that the defect information obtaining portion 36 is replaced with an initialized data reading portion 39.

Figure 24:
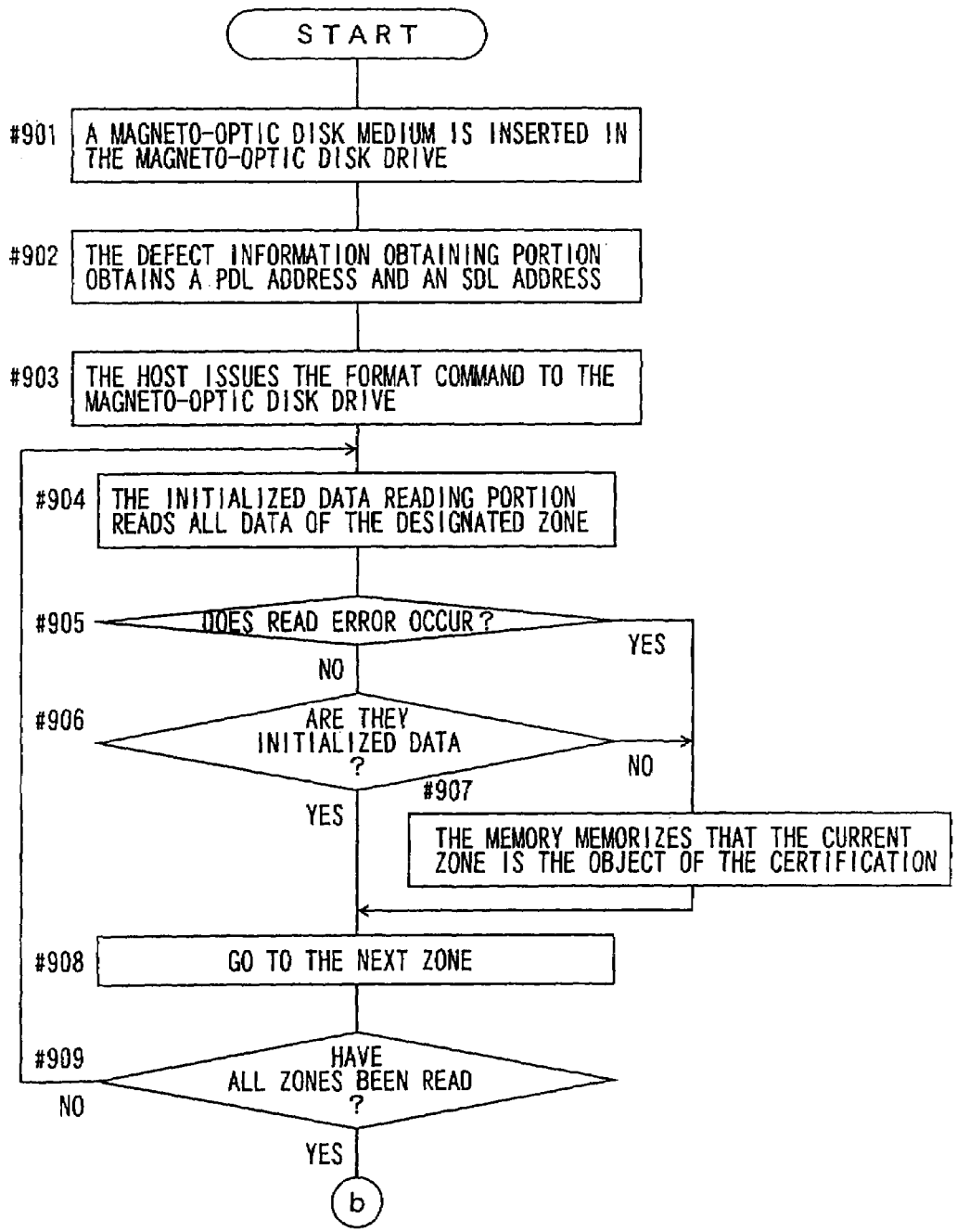
FIG. 24 shows the first half of a flowchart of a physical formatting process according to the sixth embodiment of the present invention.
Figure 25:
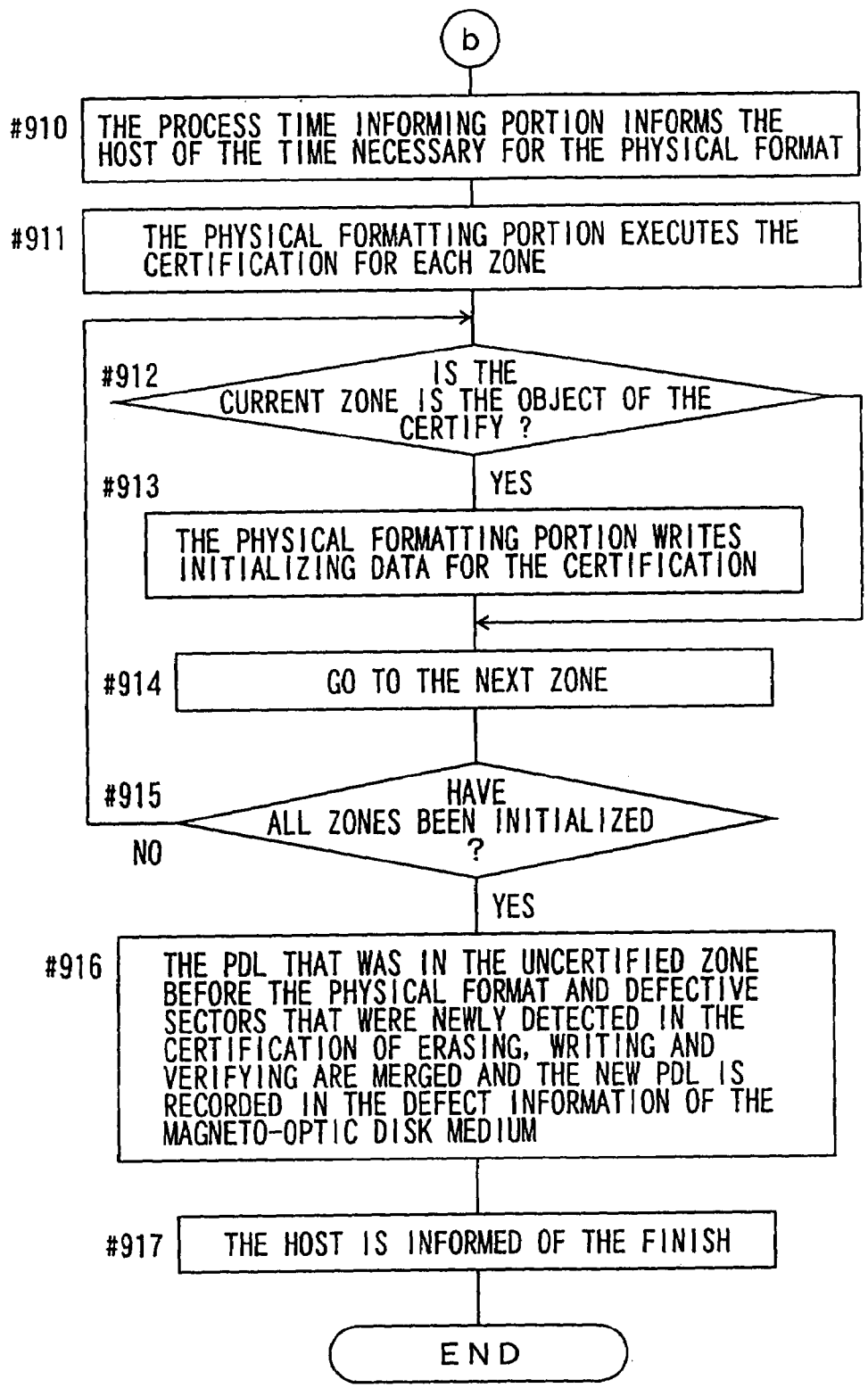
FIG. 25 shows the latter half of a flowchart of a physical formatting process according to the sixth embodiment of the present invention.

FIGS. 24 and 25 show a flowchart of a physical formatting process according to the sixth embodiment. In Step #901, the magneto-optic disk medium 31 is inserted in the magneto-optic disk drive 32, when the defect information obtaining portion 36 obtains a PDL address and an SDL address, which are stored in the memory 35 (Step #902). In Step #903, the host 33 issues the format command to the magneto-optic disk drive 32, when the initialized data reading portion 39 reads all data of the designated zone (Step #904).

If a read error occurs (YES in Step #905), the reading process of the zone is halted, and the memory 35 memorizes that the current zone is the object of the certification (Step #907) before going to the next zone to be read (Step #908). If data different from the initialized data (e.g., "CF23" in hexadecimal) are detected in the data of the designated zone (NO in Step #906), the reading process of the zone is also halted, and the memory 35 memorizes that the current zone is the object of the certification (Step #907) before going to the next zone to be read (Step #908).

In Step #909, it is checked whether all zones have been read. The process from Step #904 through Step #909 is repeated until all zones are read. After all zones are read, the process time informing portion 37 adds average certification times of the zones to be certified so as to calculate the total time necessary for the physical format in Step #910, which is informed to the host. The process of Step #910 (or the process time informing portion 37) is not essential and can be omitted.

In the process after Step #911, the physical formatting portion 34 executes the certification for each zone. In Step #912, it is checked whether the current zone is a zone to be certified. As explained above, zones to be certified are memorized in the memory 35 in Step #907. If the current zone is a zone to be certified, initializing data are written for executing the certification process in Step #913, followed by the process for the next zone (Step #914). If the current zone is not a zone to be certified, the process goes to Step #914 without executing the certification. Defective sectors that were detected in the certification process are memorized in the memory 35.

In Step #915, it is checked whether all zones have been initialized. The process from Step #912 through Step #915 is repeated until all zones are initialized. After all zones are initialized, the physical formatting portion 34 merges the PDL that was in the uncertified zone before the physical format and defective sectors that were newly detected in the certification of erasing, writing and verifying so as to record it as a new PDL in the defect information recording area (DMA) of the magneto-optic disk medium 31 in Step #916. In the final Step #917, the end of the physical format is informed to the host 33 and the process is finished.

In general, there is high possibility that a zone in which initialized data remain has not been used and does not require the certification again. According to this presumption, the present embodiment can shorten the time necessary for the physical format by omitting the certification of zones in which initialized data remain in the physical format. In order to decide whether the current zone needs the certification, the data reading step (Step #904) is required. However, the additional step of only reading requires shorter time than the certification of erasing, writing and verifying.

In a variation of the above-mentioned embodiment, only a part of data can be read instead of reading all data of the designated zone in Step #904. For example, a predetermined number of sectors of the leading portion, the middle portion and the end portion of each zone can be read. If data different from the initialized data are detected in those data (NO in Step #906), the zone is memorized as a zone to be certified in Step #907.

Thus, the reading time for deciding whether the current zone needs the certification can be shortened. As a result, the total time necessary for the physical format can be further shortened.

In another variation of the above-mentioned embodiment, a quasi certification can be executed instead of omitting the certification process when the current zone is not to be certified, i.e., data different from the initialized data were not detected in Step #912. The quasi certification portion 38 shown in FIG. 23 performs this process. In FIG. 25, if it is NO in Step #912, the quasi certification portion 38 executes the quasi certification before going to Step #914.

The quasi certification performs only the read check of the data or the ECC (data of check) as explained above. The total time of the format process becomes longer than the case where no certification process is executed, but the reliability increases. In addition, the time necessary for the quasi certification is still shorter than the case where the certification of erasing, writing and verifying is performed.

When the quasi certification is performed, defective sectors that were detected in the quasi certification and defective sectors that were detected in the certification of erasing, writing and verifying are merged, and the newly generated PDL is recorded in the defect information recording area (DMA) of the magneto-optic disk medium 31 in Step #916 of FIG. 25.

The several embodiments of the present invention explained above can be combined in any combination.

As explained above, the present invention provides a method of formatting a disk recording medium as well as an information recording and reproducing apparatus in which the formatting process is executed not in the order of logical address from inner radius to outer radius or the opposite order as the conventional method, but in the discontinuous order of the number of potential defects in accordance with the result of the last format or characteristics of the disk recording medium. Therefore, if the defect number exceeding error occurs, it can be detected in earlier stage than the conventional formatting process.

In addition, the certification including three steps of erasing, writing and verifying is not executed for zones that are considered to require no certification, or only a quasi certification is executed for those zones, so that the total time necessary for the physical format can be shortened.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A method of formatting a disk recording medium in which a data recording area is divided into plural zones in the radial direction and defect information is managed for each of the plural zones, the method comprising the steps of:
   obtaining SDL information of the disk recording medium by defect information obtaining means;
   detecting zones having the SDL information as zones to be certified; and
   certifying only the zones that were detected to be certified by erasing, writing and verifying.

2. The method according to claim 1, further comprising the step of informing a host of the time until the finish of the formatting process by a process time informing means.

3. The method according to claim 1, further comprising the step of performing quasi certification of the zones that were not detected to be certified.

4. A method of formatting a disk recording medium in which a data recording area is divided into plural zones in the radial direction and defect information is managed for each of the plural zones, the method comprising the steps of:
   reading data of each zone by initialized data reading portion;
   detecting zones having data except initialized data as zones to be certified; and
   certifying only the zones that were detected to be certified by erasing, writing and verifying.

5. The method according to claim 4, further comprising the step of informing a host of the time until the finish of the formatting process by a process time informing means.

6. The method according to claim 4, further comprising the step of performing quasi certification of the zones that were not detected to be certified.

* * * * *